Feb. 6, 1968  W. E. RUSSELL ET AL  3,367,640
HEATING ASSEMBLY FOR HEAT-TREATING OR GRAPHITIZING
CONTINUOUSLY MOVING MATERIALS AND PROCESS
OF HEAT-TREATING AND/OR GRAPHITIZING
FLEXIBLE FIBROUS MATERIALS
Filed April 28, 1966  5 Sheets-Sheet 4
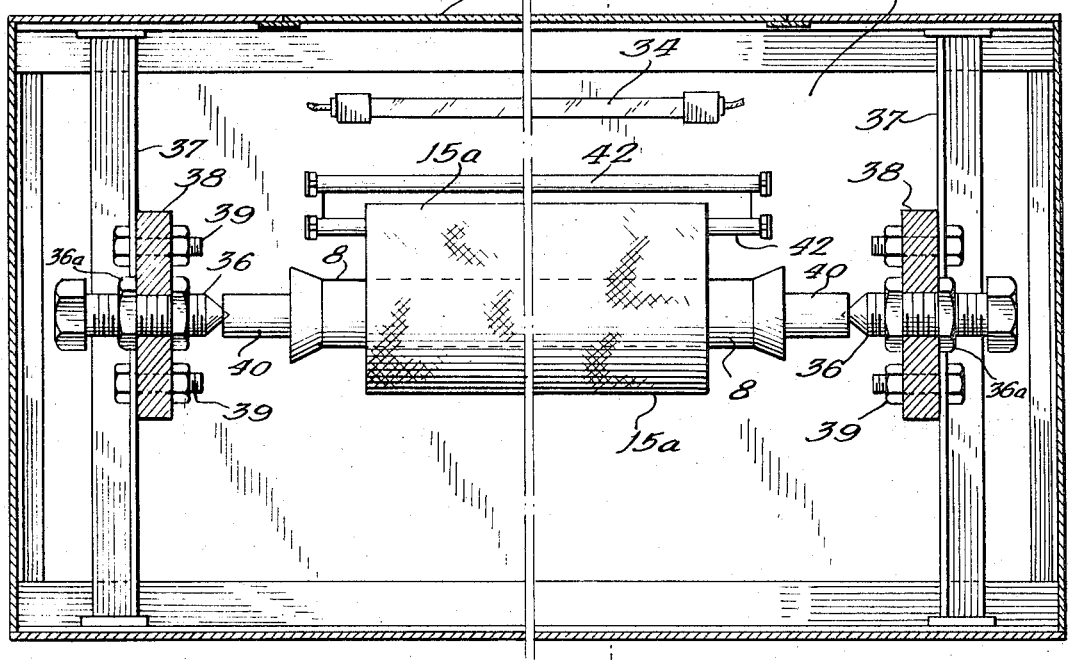
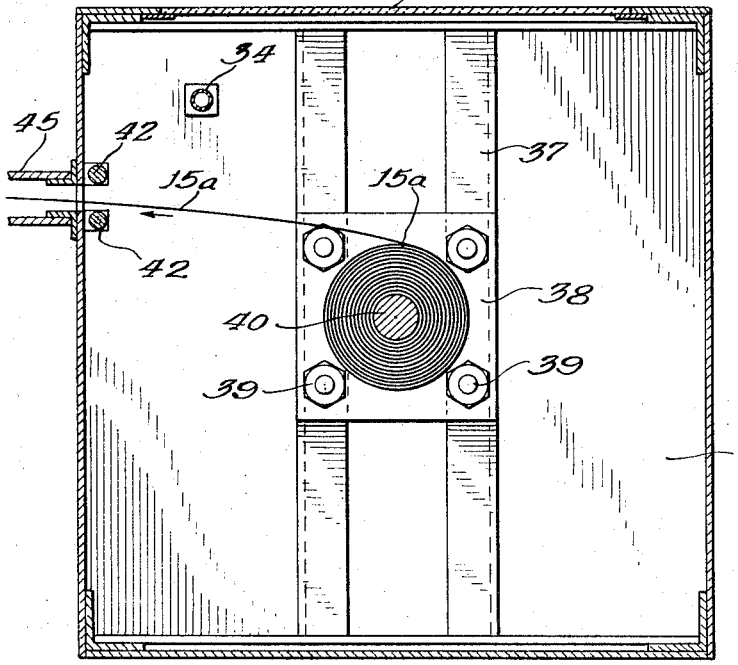
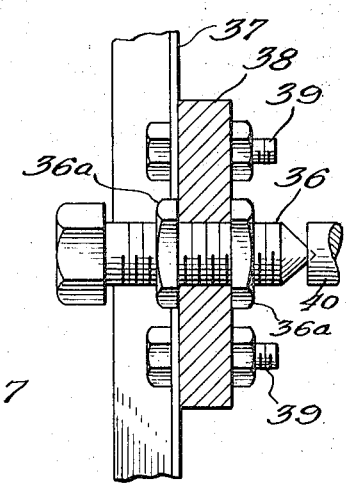

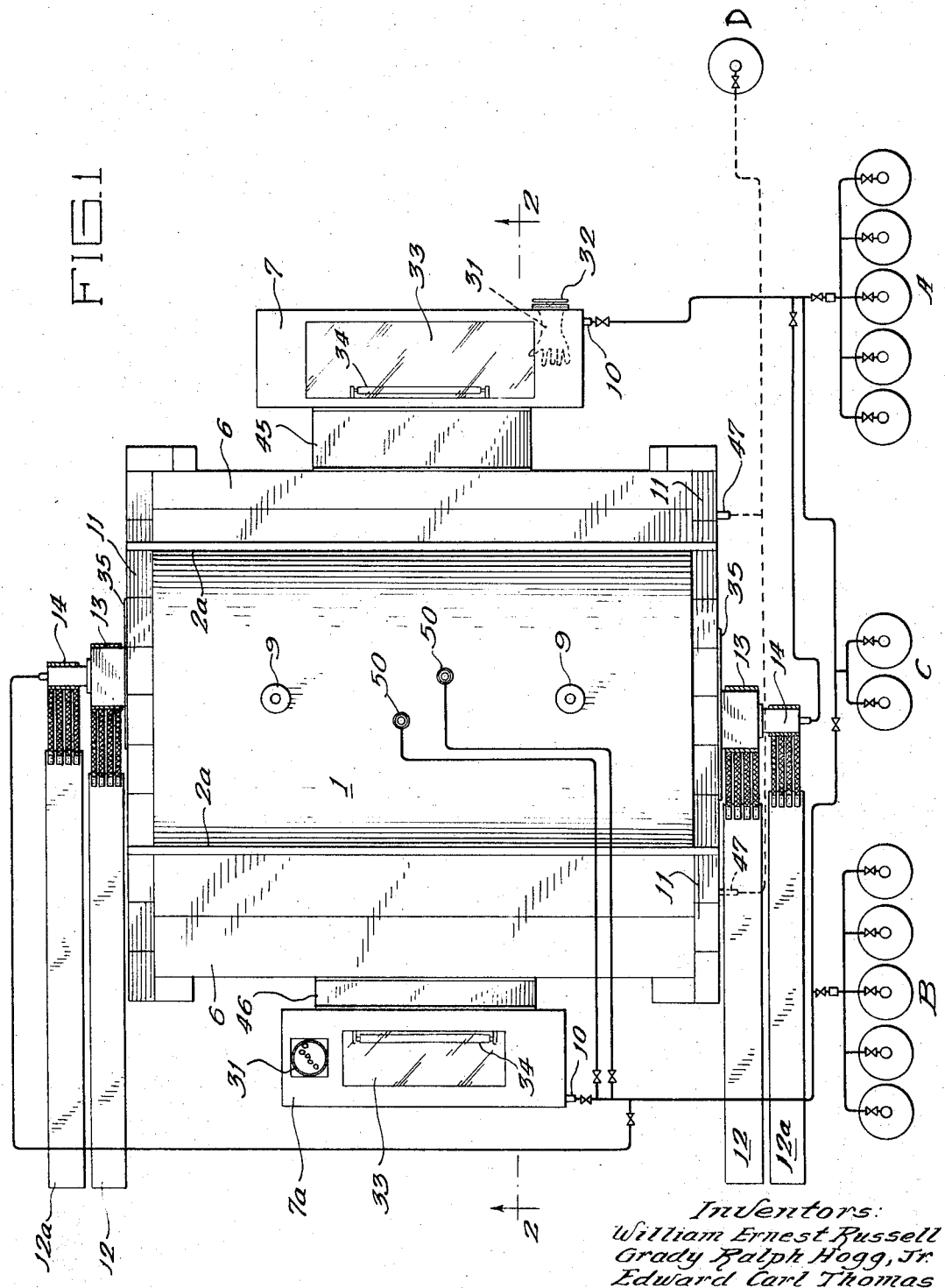

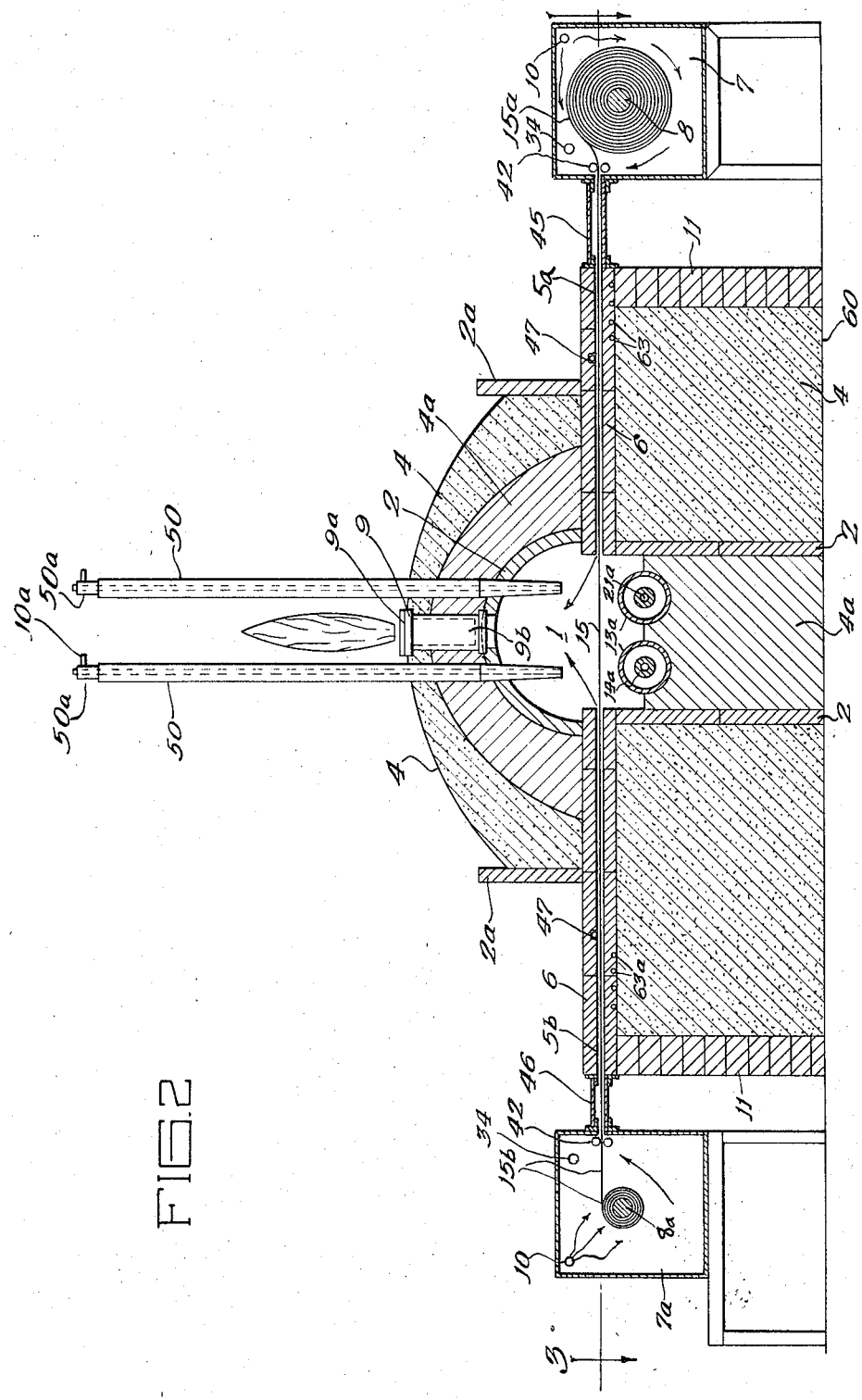

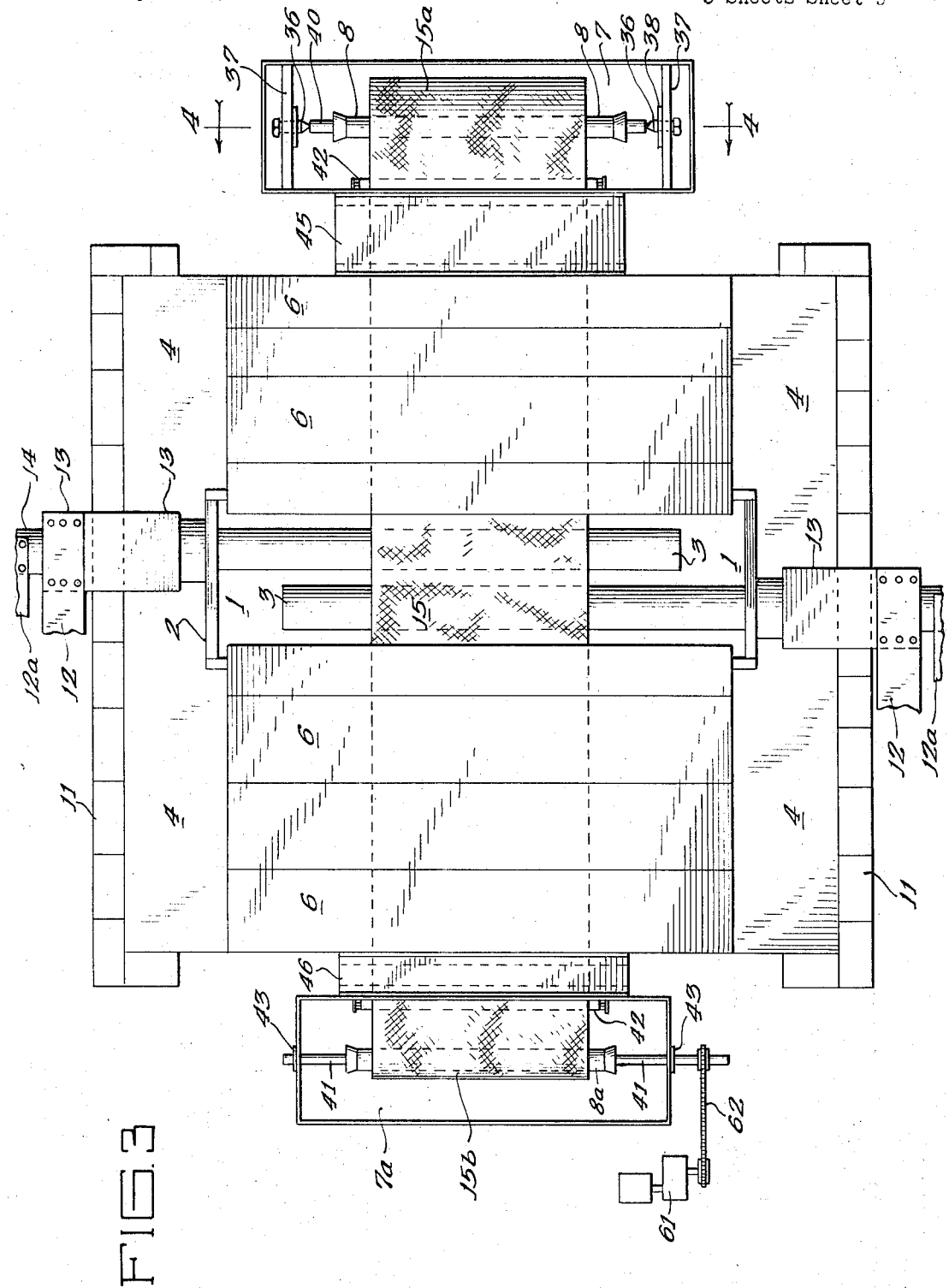

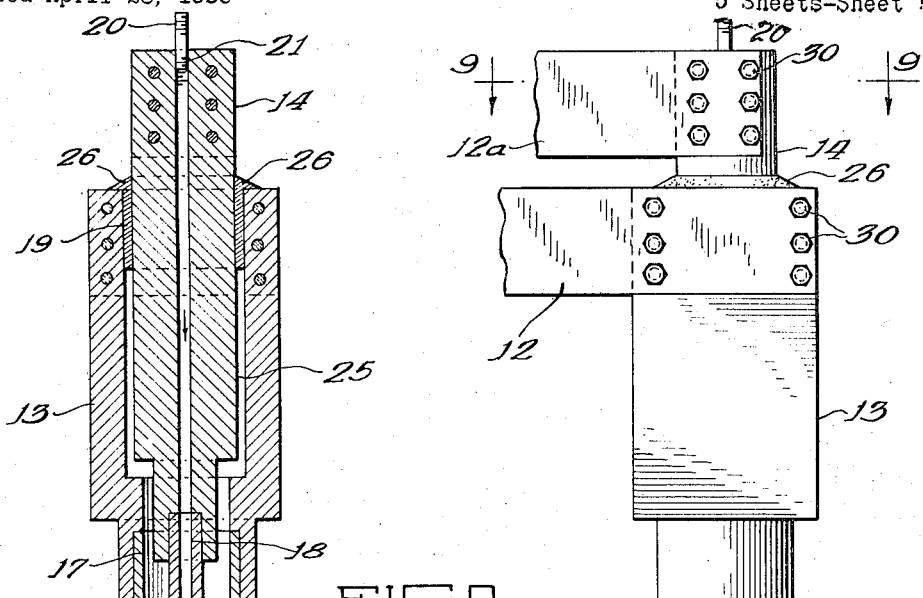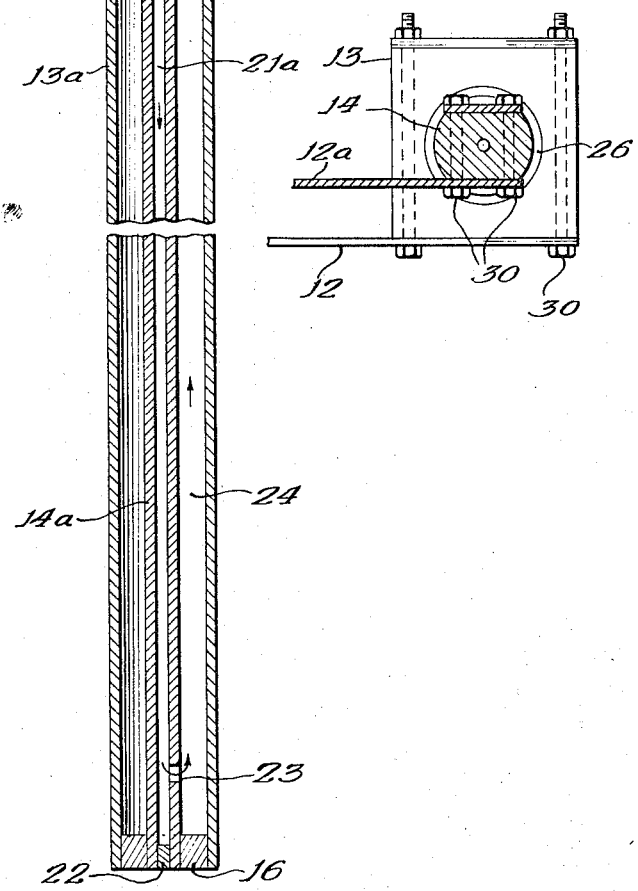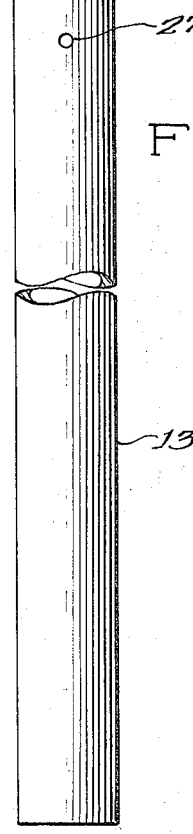

United States Patent Office 3,367,640
Patented Feb. 6, 1968

3,367,640
HEATING ASSEMBLY FOR HEAT-TREATING OR GRAPHITIZING CONTINUOUSLY MOVING MATERIALS AND PROCESS OF HEAT-TREATING AND/OR GRAPHITIZING FLEXIBLE FIBROUS MATERIALS
William E. Russell and Grady R. Hogg, Jr., Morganton, N.C., and Edward C. Thomas, Lancaster, Calif., assignors to Great Lakes Carbon Corporation, New York, N.Y., a corporation of Delaware
Filed Apr. 28, 1966, Ser. No. 546,098
22 Claims. (Cl. 263—3)

This invention relates in general to a heating assembly of unique design which is useful for heat-treating or graphitizing materials while they are continuously moving. More particularly, this invention relates to the field of flexible carbon, semi-graphitic or graphitic fibers, most typically of cellulosic origin, whether in the form of cloth, filaments, tape, felt, yarn, cords or other flexible textile forms such as knits or braids, and most particularly to the heat-treatment of such materials at high temperatures by a continuous process after said materials have been initially heated or carbonized at lower temperatures. The processing techniques of this invention apply most specifically to carbonized natural cellulosic materials, or carbonized regenerated cellulosic materials such as viscose rayon, cuprammonium rayon and saponified acetate rayon, but may also be used to heat-treat, carbonize, and/or graphitize carbonizable or carbonized fibrous materials of other origin.

Specific objects of the invention are:

To provide a means for and process of heat-treating such carbonized fiber materials as just described to temperatures typically between about 1300° C. and about 2700° C. and sometimes as high as 2900–3000° C.;

To provide a means for and process of heat-treating continuously moving materials to substantially elevated temperatures such as between about 500° C. and 2900° C.;

To enable the production of carbon, semi-graphitic or graphitic fibrous materials exhibiting excellent properties such as high tensile strength, flexibility, structural integrity or form, low electrical resistivity, low ash content, low volatile matter content, resistance to oxidation or chemical attack, high carbon content, and other desirable properties;

To allow the heat-treatment of flexible textile or carbonized fibrous materials to be conducted in a continuous manner such that the processing conditions remain uniform and rae reproducible so that products of uniform properties will be obtained;

To enable the use of faster and more economical production rates in additionally heat-treating and processing pre-carbonized fibrous materials than have generally been employed by prior art techniques; (by "pre-carbonized" is means that the initial cellulosic materials have already been heated to temperatures substantially above room temperature, such as, for example, to a temperature between about 500° C. and about 1000° C. during which their carbon content has been greatly increased);

To provide for means of conducting the heat-treatment of continuously moving materials, such as carbon fiber materials, in an atmosphere or environment of extreme purity, devoid (or substantially devoid) of such undesirable gaseous impurities as oxygen, vaporized mineral ash, hydrocarbon gases, or other agents deleterious to achieving desired properties;

To optionally allow the use during the heat-treatment of such continuously moving materials of purifying agents such as chlorine, carbon tetrachloride, or Freon (Freon is a registered trademark of E. I. du Pont Company for a group of fluorochloromethanes and ethanes) as may be required to eliminate or reduce considerably the content of mineral ash, metals, or other impurities in the materials being processed; and To allow various carbon fiber materials to be additionally heat-treated or graphitized continuously and also in such a manner that folds, wrinkles, or other deviations or distortions from the desired forms of these products are not incurred.

The foregoing objects as well as others which will become apparent upon an understanding of the invention herein described are accomplished by processing the starting carbon fibrous materials through a specially designed heating assembly, which assembly, and various essential features thereof, are illustrated in FIGURES 1 through 9 wherein:

FIG. 1 is a schematic and plan view of the entire heating assembly;

FIG. 2 is a vertical sectional view of the entire heating assembly, taken along lines 2—2 of FIG. 1;

FIG. 3 is a horizontal sectional view of the entire heating assembly, taken along lines 3—3 of FIG. 2;

FIG. 4 is a vertical sectional view of an enclosed compartment at the entrance of the heating assembly (in which compartment the carbonized fibrous material to be processed is typically mounted on a free-rolling shaft), and is taken along lines 4—4 of FIG. 3;

FIG. 5 is an end sectional view of the compartment of FIG. 4, taken along the lines 5—5 of FIG. 4;

FIG. 6 is an enlarged view of one of the "point bearing" arrangements used with the free-rolling shaft employed in the compartment shown in FIG. 4;

FIG. 7 is a side-sectional view (broken) of one of the heating element combinations or units used in the heating chamber of the heating assembly;

FIG. 8 is a side view (broken) of one of the heating element units of the heating chamber as well as of the electrical connections made to said heating element unit; and FIG. 9 is an end view of the heating element unit and electrical connections of FIG. 8 taken along the lines 9—9 of FIG. 8.

The entire heating assembly comprises the following parts:

I. *A furnace comprising.*—(a) A heating chamber 1 fabricated from or defined by a substantially thermally stable structural material 2 such as graphite and containing at least one electrical resistance heating unit 3 of a specific design, said heating chamber also typically and preferably being provided with thermal packing insulation means 4a such as carbon black or Thermax (Thermax is a trademark of the R. T. Vanderbilt Company, for finely divided carbon obtained by thermal decomposition, or cracking, of natural gas) for supporting the heating element unit(s), and with one or more exhaust stacks or chimneys 9 leading out of the heating chamber as might serve to allow the escape of gases used and any volatile matter and ash vapors and other impurities which might be evolved during the heat-treatment; and (b) Two hermetically sealed passageways, entry passageway 5a and exit passageway 5b leading into and out of the heating chamber, which passageways may be constructed of and defined by thermally stable structural materials such as graphite plates 6, of appropriate size and shape and arrangement as to permit the material 15 being processed and heat-treated to be conducted into and out of the heating chamber in a substantially stress and strain free condition and through the passageways in a substantially impurity-free and air-free environment. The length of each of the passageways 5a and 5b may typically be about four fet and that of the heating chamber 1 about two feet. It is desirable also, that the passageways on either side of the heating chamber have forced cooling means near their inlet (passageway 5a) and their outlet (passageway 5b); otherwise the inlet and exit passageways should be lengthened to permit proper cooling and temperature control. The heating chamber should be of sufficient length so as to heat the material being processed to the desired degree while it is passing through the furnace at a satisfactory rate (such as from 0.5 to 20 feet and more typically from about 1 to about 11 feet per minute);

II. Two substantially gas-tight, closed chambers or compartments 7 and 7a fitted or operatively connected, respectively, to the ends of the entry (5a) and exit (5b) passageways remote from the heating chamber 1, said compartments being of suitable size and shape as to contain and also so built as to enclose in a substantially airtight manner some quantity of the material to be heat-treated; for example, of *carbon* fibrous material *prior* to the heat-treatment to be performed (fibrous material 15a in compartment 7), or, for example, *graphite* fibrous material *after* the heat-treatment (fibrous material 15b in compartment 7a). (It will be noted from a comparison of fibrous materials 15a and 15b in FIG. 2 that the material processed typically undergoes a substantial dimensional shrinkage when heat-treated);

III. Suitable means, such as spools or reels 8 and 8a, mounted around free-rolling shaft 40 and shaft 41 (shaft 41 being motor-driven), contained within the compartments 7 and 7a, respectively, to enable the carbon fibrous material 15a to be heat-treated to be continuously transferred (and with a minimum of strain thereon) from compartment 7, through connecting passageway 5a, into the heating chamber 1, out through the other passageway 5b, and then to be continuously taken up around spool 8a in the other compartment 7a. Means 42 such as smooth stainless steel bars or pipes are typically employed near the outlet of compartment 7 and the inlet of compartment 7a as guides for the material being processed and to help maintain it in a stress and strain-free condition. These guides are so positioned that they help align the material with passageways 5a and 5b. Air-tight enclosures 45 and 46 fabricated from a smooth structural material such as Masonite are also typically employed between the compartments 7 and 7a and the furnace;

IV. Inlet means, such as connections 10 to the compartments 7 and 7a, in order to inject inert or oxygen-free gases (such as nitrogen) under pressure into passageways 5a and 5b and then into the heating chamber 1 so that said gases sweep substantial portions of the entry and exit passageways. Other inlets or connections such as 47 through brick wall 11 and into graphite plates 6 may optionally also be used to permit oxygen-free purifying gases, such as chlorine for example, or blends of inert and purifying gases to be admitted under pressure into the furnace to contact the material being processed; and V. Controls (not illustrated), as may be necessary, to allow the power input into the heating element unit(s) to be varied so that the heat-treating temperature may be regulated and controlled. Suitable means such as sight tubes 50 for taking optical pyrometer temperature readings on the cloth above each of the heating element unit(s) 3 are also generally provided.

As previously indicated, an important feature of the entire or overall heating assembly of this invention is that the various main parts or components of same are effectively gas-tight or hermetically sealed and also interconnected so that when gases are admitted at connections such as described, no air will be admitted; and admitted gases or evolved gases or impurities are forced to flow inward to the heating chamber 1 and upward from the heating chamber through the stack(s) or chimney(s) 9.

Another important feature of the overall heating assembly of this invention is that, because of its design, when the furnace is heated the materials of construction do not result in the generation or vaporization of such quantities of ash or other impurities as may be deleterious to the purity or cleanliness of the atmosphere contained within the heating chamber of the furnace, also, volatiles and ash or other impurities which evolve from the fibrous material being processed are substantially prevented from re-depositing upon the fibrous material while the fibrous material is being processed and heated.

Other important features of the invention will become clearer from the following more detailed discussion of the drawings. As aforestated, FIGURES 1–3 show various views of the entire heating assembly. The heating chamber 1 of the furnace utilizes at least one and typically two concentric heating element units or combinations of specific design and designated generally as 3. Basically, the furnace is composed of heating chamber 1 with passageways 5a and 5b leading into and out of this chamber. The passageways typically are approximately one-half inch high, about 40 inches wide and about four feet long and are typically constructed from graphite plates 6. As previously indicated, the length of the heating chamber can typically be about two feet. These furnace dimensions are meant to be representative only. Dimensions varying widely from these may, of course, also be used particularly if the passageways are not force cooled, or if more than two heating element units are used in the heating chamber. As best shown in FIG. 3, the width of the passageways 5a and 5b, defined by graphite plates 6, and of heating chamber 1 defined by graphite plates 2, is less than the width of the furnace, defined by outer walls 11. This is the general and preferred construction, although for relatively low temperature heat-treating operations, e.g., 500° C. or 700° C., little insulation is required outside the heating chamber walls.

The heating chamber itself is heated by one or more (typically two), concentric heating element units 3, shown in detail in FIG. 7. These heating element units are preferably fabricated from graphite, especially if the material being processed is to be heated to very high temperatures, such as temperatures between about 1300° and about 2900° C. (The furnace may also advantageously be employed at temperatures much lower than 1300° C. such as at temperatures of about 500° C. and higher.) Sight tubes 50 for optical pyrometer temperature readings and two vapor stacks or chimneys 9 are located in the top section of this chamber. These chimneys vent out the ash and other volatiles given off by the cloth (or other fibrous material) during its heat-treatment (causing a flame when the volatile matter unites with the outside atmosphere); they also vent any ash or impurities that may be evolved from the structural members of the furnace. The chimneys may also possess a throttle plate 9a to control the pressure within the furnace, and a readily removable insert 9b which may be easily replaced in the event that ash or other impurities may condense and deposit therein without having to shut down and dismantle the furnace. Inert gas purges (typically nitrogen) from main supply banks A and B and/or reserve supply bank C and into inlets such as 10 in each end compartment 7 and 7a and then through passageways 5a and 5b into the heating chamber 1 are used to further assist in maintaining a substantially oxygen-free atmosphere inside the heating assembly and furnace and also to sweep the passageways their entire length (or substantially their entire length) to substantially prevent impurities such as volatiles or ash from depositing or re-depositing on the cloth (or other fibrous material being processed) in the passageways. The total atmosphere or free space in the heating assembly, viz. in the end compartments, heating chamber and in the passageways is substantially free of oxygen while the material is "in process" and being heat-treated. The compartments and passageways and heating chamber and the material to be processed are all, of course, either evacuated of air and/or flushed with the inert gas before the heat-treating process is begun. Inert gas is also typically fed into sight tubes 50 through inlets 10a in sight tube caps 50a to prevent their obstruction from the vapor products of decomposition.

At higher temperatures, a good quality thermal insulating material 4a, such as loose carbon black or Thermax, is typically used as thermal insulation packing around the furnace, especially in the heating chamber to support the heating elements, and above the heating chamber area. The use of packing within the heating chamber, however, is not essential since the heating element units may be cantilevered and supported only at the header ends by the heating chamber walls. Its use, however, is both desirable and much preferred. Somewhat inferior or less costly loose thermal insulation packing such as carbon particles or old graphite fines 4 are typically used elsewhere around the furnace. These carbon particles or graphite fines may be on top of or surrounded or enclosed by graphite structural members 2 and/or graphite plate 6 and/or restraining bricks or walls 11. These bricks or walls 11 may be conventional furnace brick or may also be made from a refractory material such as carbon or graphite. The thermal insulation need not be in loose form and may be in the form of blocks or other structural shapes. Lose packing however is preferred for ease of constructing the assembly and also for cost considerations. The entire furnace and heating assembly may typically be built upon a concrete base 60. The heating chamber and passageways and end compartments are all effectively hermetically sealed so that substantially no air can get into the heating assembly. Operators of the process may readily adjust or align the material being processed (such as a bolt or roll of carbon cloth) without allowing air to enter the system by means of rubber gloves 31 in compartments 7 and 7a, which gloves are connected to said compartments through gas-proof fittings 32. Each of the compartments will also typically possess transparent tops or covers 33 and lights 34 therein to permit visual observation of the material to be processed and after it has been processed.

FIGURE 3 illustrates a horizontal sectional view of the heating assembly showing a cloth fibrous material 15 (designated as 15a before being heat-treated and 15b after being heat-treated) coming into the furnace from the entrance end compartment or closure 7, and passing over the two concentric heating element units 3 and into the exit end compartment or closure 7a. The cloth is pulled through the furnace mechanically by means of reel 8a in compartment 7a, which reel is linked to shaft 41 which is coupled to motor 61 through reduction gears 62.

Also shown in FIG. 3 is insulation 4 such as graphite fines placed between the sides of the heating chamber and the furnace side brick wall 11. It will be noted from this figure and from FIG. 2 that Thermax or other coke or graphite fines (or other suitable thermal insulation) surround all portions of the heating chamber, which chamber is defined at its sides and ends and top by thermally stable structural members 2 (typically graphite). As is apparent from FIG. 2, thermal insulation (in typical loose form) is also provided between passageways 5a and 5b and the base 60 upon which the furnace is built and on top of the passageways for substantial distances from the heating chamber (as far as the restraining walls or "boards" 2a, typically also made from graphite). This furnace design which includes the use of considerable amounts of thermal insulation (typically in loose form) provides an effective thermal barrier substantially preventing heat loss from the heating chamber to the outside and permits a feasibly constructed furnace for high temperature operations (dimensionwise and materialwise) as well as a very efficient processing operation.

The furnace design is such also that the fibrous material being processed can be processed continuously at very satisfactory rates such as up to about 20 linear feet per minute, but more typically between about 1 and about 11 feet per minute. The structural members 2 such as graphite plates used to define passageways 5a and 5b are typically and preferably force-cooled by water (passageway 5a near the entrance portion thereof and passageway 5b near the outlet or exit portion thereof) which is cycled through copper tube coils 63 and 63a built into the passageway structural members near the ends of the passageways remote from the heating chamber. The fibrous material being processed is not solely or entirely heated in the heating chamber 1 but is heated somewhat as it nears the other end (or warmer end) of passageway 5a (the end proximate to the heating chamber) before it encounters the high temperatures which prevail within the heating chamber 1. In passageway 5b the fibrous material is cooled by first going through the warm end of the passageway (or the end proximate to the heating chamber) before going through the end which is surrounded by cooling coils 63a. (The structural members or graphite plates which define passageways 5a and 5b are, of course, warm near the heating chamber 1 because of the heat from the heating unit(s) 3 within the heating chamber.) The surfaces of the structural members or graphite plates 6 in passageways 5a and 5b are typically also very smooth and level horizontally so that little or no friction or impediment to movement (or stress or strain) is encountered by the fibrous material as it goes through the heating assembly from reel 8 to reel 8a through the passageways and the heating chamber. It should be noted that in the heating chamber illustrated in FIG. 2 the material being processed passes therethrough above the heating element unit(s) and between the heating element unit(s) and the chimney(s). It should be noted that if the heating element units are supported in a cantilever fashion that the heating chamber could be so constructed that the material being processed could pass under the heating element unit(s) as well as above same. This, however, is not possible in the case where the heating element unit(s) rest upon a packing material in the heating chamber. It should be noted also that typically in the heating chamber, the material being processed is unsupported by any structural members, such as those which define passageways 5a and 5b. This is the preferred construction in the heating chamber but it should be appreciated that perforated graphite plates or graphite rods or bars could be used to support the material being processed if desired. The top and bottom structural members or graphite plates 6 in the passageways are also typically kept uniformly spaced from each other by strips (typically made from graphite) which run transverse to the plates the length of the passageways 5a and 5b and on both sides thereof. These strips which typically maye be ½ inch thick and one inch wide also prevent air and/or packing material from entering the passageways. This spacing, which is best shown in FIG. 2, is also typically much greater than the thickness of the material being processed, thereby further insuring only slight contact of the material being processed with the smooth surfaces of the structural members 6 of the passageways, and also insuring considerable opportunity for and completeness of contacting all of the surfaces of the fibrous material being processed with the inert gas while the fibrous material is contained in the passageways.

The inert or non-oxidizing gases such as nitrogen used within the heating assembly and particularly the manner in which they are controlled and used are also of considerable importance in the heating assembly design of the present invention. The quantities of inert gas used will vary to suit the particular conditions encountered and vary with the temperatures used, the volatile and ash content of the fibrous material being processed and the quantities evolved, the throughput rates, the furnace size, etc. These gases are piped under controlled flow rates such as at 150 and 240 standard cubic feet per hour, respectively, for the furnace size described (typically via the compartments 7 and 7a) through the passageways 5a and 5b into the heating chamber 1 and then out through chimney(s) 9. Any volatiles or ash or other impurities given off by the fibrous material 15 being processed, or by structural members such as 6 or 2 because of their being heated the first time are, therefore, swept out through chimney(s) 9 and cannot deposit or re-deposit upon the fibrous material near the product exit end of passageway 5b. (This exit end and the fibrous material passing therethrough are also cool in this region so that for this reason also no volatiles or ash are being evolved in this region which can deposit or re-deposit upon the heat-treated fibrous material.) It should also be noted, as aforesaid, that typically and preferably the structural members or graphite blocks or slabs 6, which define passageways 5a and 5b, terminate at the heating chamber 1, and do not bridge same. Therefore, any ash or volatiles, etc., which might emanate from the fibrous material, particularly in high-temperature operations such as at 2000–2900° C., can thereby (because of the porous nature of the fibrous material or openings therein) be more effectively swept and eliminated by means of the inert gases from the passageways without any interference from structural members or graphite slabs in this area.

This treatment, or sweeping of volatiles and/or ash, etc., from the fibrous material with an inert gas, can largely, or substantially entirely, take place within the warm zones of the passageways 5a and 5b proximate to or near the heating chamber or at points in the heating chamber very close to the exit end of passageway 5a or entry end of passageway 5b and this typical flow of inert gas is indicated by the arrows within the heating chamber of FIG. 2. In other words, the flexible material being processed is typically and preferably swept with an inert gas at least part of the time it is continuously passing through the heating assembly but it is not necessary that the inert gas sweep the fibrous material the entire distance across the heating chamber because the materials evolved from the fibrous material being processed can be removed without doing this.

The heating element units 3 may also be, and preferably are, so constructed that inert gases may be injected therein and around the members of same and then into the heating chamber and then out through chimney(s) 9, and such construction is described in more detail hereinafter. This may particularly be resorted to in order to prevent or minimize oxidation of the heating units. Such an alternative can also be used to assist in the removal of the volatiles and ash evolved from the fibrous material in the heating zone 1. This, however, is not essential for producing a satisfactory material although it is preferred for a satisfactorily operating furnace.

Also illustrated in FIGS. 1 and 3 are electrical connections which are made to the heating element units. These connections are made by means of copper bus bars 12 and 12a which in turn are connected to primary and secondary headers 13 and 14, respectively, of the heating element units. As shown in FIG. 1, these copper bus bars may also be in flexible form in the area where connected to the headers. These electrical power connections and other features of the heating element units 3 are also illustrated in FIGS. 7–9, which are now discussed in more detail.

The heating element unit 3 is typically and preferably fabricated from formed graphite parts, particularly for high temperature processing operations such as between about 1300° C. and 2900° C. The assembly comprises, as aforesaid, primary header 13 and secondary header 14. These headers are connected to copper bus bars 12 and 12a, respectively, which bus bars are external the heating chamber and in turn connected to a power source such as a transformer designed to provide large currents at varying voltages.

The electrical circuit through the heating element unit is from bus bar 12 to primary header 13 to primary element or insert member 13a of the primary header, and then to secondary element or insert member 14a of the secondary header 14 through the end connecting conductive element 16, which serves not only to complete the circuit from the primary header to the secondary header, but also to keep the insert members or elements 13a and 14a concentrically separated and co-axially disposed. Heating elements or insert members 13a and 14a are typically press-fitted into shouldered recesses 17 and 18 of the primary and secondary headers. Instead of being press-fitted, the internal recesses of the headers may be threaded, the insert members also threaded, and the insert members electrically coupled to the headers by threaded joints. (Other techniques for joining or connecting the elements to the headers are also possible.) These headers are co-axially positioned with respect to each other but also electrically insulated from each other, such as by means of an electrical separator 19 near the ends which are connected to the copper bus bars. Separator 19 may typically be made from an electrically insulative cloth, or any other compliant material having good electrical insulating qualities, wound tightly around the secondary header.

The heating unit(s) 3 may not only be used to heat the fibrous material being processed but may, as aforesaid, also be used to convey inert gases and to transmit these gases through the fibrous material being processed and then out through chimney(s) 9 in heating chamber 1. If such an arrangement is desired, the heating unit(s) can be so constructed that the secondary header 14 and its insert member 14a may have a hollow bore therein and gases may be fed into the heating unit(s) by means of threaded pipe nipple 20 which is threaded into a threaded central cylindrical bore or opening 21 in the secondary header 14. This opening extends into opening 21a of secondary insert member 14a. Opening 21a is terminated by gas-tight closure 22, which typically may be a cylindrically-shaped, graphite plug. The inert gas (such as nitrogen), therefore, enters through pipe 20, and goes through the cylindrical bore of the secondary header and of its insert member. A hole 23, typically betwene about ¼ and ⅜ inch in diameter in the secondary insert member 14a provides a path for the inert gas near the end of the insert member remote from the secondary header. (By the time the gas has been conveyed to this point, it has reached a substantially elevated temperature.) The gas flows through hole 23 and then into the hollow bore 24 of the primary insert member 13a. Hollow bore 24 extends into spacing 25 between the primary and secondary headers, but spacing 25 is sealed by means of the electrically insulative separator 19. To further insure a gas-tight seal for opening 25, an additional seal 26 such as a cotton rope may be wedged in the space between the headers 13 and 14 and then sealed such as by means of an electrically non-conductive epoxy cement. A hole 27, similar to opening 23, is provided in insert member 13a so that the injected inert gas can exit from the heating element unit into the heating chamber. Because it is heated, and also because it is under a very slight pressure, it rises through the fibrous material 15 being processed and also partially assists in preventing the volatiles and mineral ash, etc., given off by the fibrous material from re-depositing upon the fibrous material, but instead causing them to be conveyed out chimney(s) 9. Headers 13 and 14 will typically be rectangularly shaped on their outsides in order to permit good mechanical and electrical connection (such as by means of bolts 30 as shown in FIGS. 8 and 9) to the external power source through conductors 12 and 12a. The shouldered recesses and bores of the headers, however, are cylindrically shaped as previously discussed. As shown in FIGS. 1 and 3, headers 13 and 14 partially extend into the furnace through furnace wall 11. Typically, however, the headers are entirely or substantially entirely outside the main heating chamber 1 and the walls thereof. Because of this arrangement the headers may be conveniently cooled outside the furnace walls 11 such as by means of running water, and thereby minimize or prevent their possible expansion due to heat, which expansion if permitted could cause structural damage to the furnace walls 11 and concomitant air leakage as well. Water seepage into the furnace may be prevented by fiber glass sheets 35 which contact the furnace walls 11 in the area of the headers. The cooling water may be collected in a splash pan which empties into a drain.

As shown in FIGS. 2 and 3, two heating element units 3 are typically employed in the heating chamber 1. It should also be appreciated that the placement of the hole 27 in insert member 13a is variable so that the inert gases may be caused to flow through the fibrous material being processed wherever desired and that this may vary depending upon whether one or two (or more) heating elements are employed and depending upon the width of the fibrous material being processed, etc. In other words, the hole arrangements for insert members 14a and 13a may vary depending upon whether the material being processed is a narrow strand or rope, or cloth which is very wide by comparison, etc.

As previously stated, inert gas is primarily caused to enter the furnace through ducts 10 such as in the hermetically sealed chambers 7 and 7a. The path of gas from these openings is through passageways 5a and 5b, respectively, and then into heating chamber 1, and then out cihmney(s) 9. These inert gas paths serve to insure that substantially all volatiles or ash, etc., given off by the fibrous material, either before it enters the heating chamber, or while within the heating chamber, or after it leaves the heating chamber, will be driven out through chimney(s) 9 rather than re-deposited upon the fibrous material being processed. These same safeguards apply to any ash which might be evolved from structural elements of the furnace, such as structural members 2 or graphite plates 6. Also, as aforesaid, the inert gas through passageways 5a and 5b is generally under only relatively low or slight positive pressures so that by the time it reaches the heating chamber 1 it typically immediately rises and does not sweep across the entire surface of the fibrous material but only part of its surface while it is being processed through the heating chamber. This is depicted by the arrows in the heating chamber in FIG. 2.

Instead of strictly inert gases, or in conjunction therewith, purifying agents (from supply source D) such as chlorine, carbon tetrachloride, or Freon may be cycled through openings 10, or through diffusers 47 in graphite plates 6, or through opening(s) 20 in the heating element unit(s) 3. For example, these may be employed in admixture with an inert gas such as ntirogen, or separately as through diffusers 47 and as illustrated in FIG. 1.

The gas-tightness of the end compartments 7 and 7a and importance of same have already been discussed in some detail, as have also some of the features of these compartments. Compartment 7 is, in the main, representative of both compartments, and its structural features as well as the structural features of the fixed bearings and free-rolling shaft within same, etc., are illustrated in considerable detail in FIGS. 4–6. Free-rolling shaft 40, around which reel 8, which holds the fibrous material to be heat-treated, is mounted, will typically be a solid steel shaft of suitable diameter (e.g., 1¼ inches) and length (e.g., four feet) with its ends milled out so as to fit the conically pointed ends of bolts 36. Reels or spools 8 (and 8a in compartment 7a) may have flared ends to assist in keeping the fibrous material being processed aligned on the reels. A load-bearing metal framework of suitable dimension is constructed for use within the compartment. This framework consists of such members as bearing-plate supports 37 to which bearing plates 38 are bolted. The bearing plates can, for example, be steel plates one inch thick and six inches square, with holes in their centers and at their corners through which pointed bolts or fixed bearings 36 and mounting bolts 39 may be fitted.

Jam nuts 36a may be used to keep the pointed bolts 36 in a set position securely fastened to bearing plates 38 and supports 37. If necessary, similar support members and bearing plates may also be employed in compartment 7a to bear the load of shaft 41 and reel 8a and the heat-treated fibrous material thereon, depending upon their weight. However, in some instances and as illustrated in FIG. 3, the walls of the compartment 7a may also be used for this purpose, depending upon the load and what the walls are made of and their thickness, etc. Also in this compartment, shaft 41 is not free-rolling nor is it connected to fixed bearings. Instead, as previously stated and as is illustrated in FIG. 3, it is motor-driven. Shaft 41 extends through circular openings in the end walls of compartment 7a. Washers 43 made of suitable material such as felt surround shaft 41 and the circular openings in the compartment through which the shaft extends and serve to substantially exclude any air from entering the compartment. It should further be mentioned in connection with these compartments that after the structural framework and support members, etc., are completed, the compartments are then enclosed such as with Masonite boards or sheet steel which are attached to the framework with angle irons and nuts and bolts, etc. Caulking compound is also used wherever appropriate to insure a gas-tight seal. Other features of compartments 7 and 7a, such as the glass tops and lights and connections for rubber gloves illustrated in FIG. 1 have already been discussed.

Using the heating assembly described and illustrated several runs were carried out with carbon cloth materials in order to produce graphite cloth. The preferred carbon cloth feed material was any carbon cloth which was non-oxidized, unwrinkled, free of visual flaws, possessed good visual appearance, was flexible and which met the following chemical and physical requirements, determined by tests as indicated:

| Percent: | Test |
|---|---|
| Carbon—94 minimum | ASTM D271–58. |
| Ash—1.5 maximum | ASTM D271–58. |
| Volatile Matter—4.5 maximum | ASTM D271–58. |
| Resistivity (ohm/square): Warp—1.5 maximum. Fill—1.75 maximum. | A one inch wide strip of cloth was placed across and pressed against two parallel copper rods three inches apart. Approximately two volts potential was applied across the two rods and the amperage passing through the sample strip was measured. The resistivity in ohms per square was then calculated by: R ohm/square=voltage/amperage×3. |
| Breaking strength (lb/in.): Warp—20 minimum. Fill—20 minimum. | A one inch wide sample of cloth was clamped at either end and subjected to increasing tension until failure occurred. The breaking strength in lbs./in. was the force in pounds required to break the one inch wide sample. |

In each run the carbon cloth feed material 15 to be graphitized was rolled onto a stiff cardboard spool or tube 8 (approximately four inches outside diameter, O.D.); approximately a fifteen inch diameter roll of carbon cloth was made. Steel shaft 40 was then inserted inside the cardboard tube and the tube fastened securely around this shaft. This assembly was then lowered into the entrance end compartment 7 and the shaft 40 secured at each end by conical "point" supports of bolts 36. This arrangement permitted the shaft and roll of carbon cloth to turn or revolve freely.

The temperature used in the final heat-treatment of the carbon fiber materials was determined by the nature of the product desired. Generally, it may be stated that if temperatures in excess of about 2000° C. were employed, materials exhibiting graphitic properties resulted, whereas, below about 2000° C., materials exhibiting amorphous or semi-graphitic properties were obtained. More specifically it may be stated that properties such as carbon assay, resistance to oxidation or chemical attack, and thermal or electrical conductivity were increased in value with increasing heat-treatment temperature while properties such as ash content, volatile matter content, and specific surface area decreased in value with increasing temperatures.

The temperature range over which the heating assembly of this invention may be used can extend from room temperature (within the end compartments) to as high as about 2900° C. if so required. The heating chamber can very advantageously provide temperatures from about 500° C. (or even lower) to the approximate temperature limit of 2900° C. A more advantageous range provided by the heating chamber and, therefore, by the heating assembly of this invention, however, can be said to be found over the temperature range of about 1300° C. to about 2900° C., and, even more preferably, over the temperature range of about 2000° C. to about 2700° C.

The length of time during which the material being processed is subjected to the heat-treating temperature in the heating assembly of the present invention is not of critical importance. One effect of increased residence time at temperature was generally a slightly increased ash content. On materials of very low thermal mass, for example such as cloth, it was found that substantially equivalent properties (other than the slightly different ash content) result for duration times ranging from less than five seconds to more than sixty seconds. For production rate considerations, however, duration times, being an inverse function of product through-put rates, are preferably kept as short as may be practical.

As previously discussed, a flow of inert gas is typically continuously directed into either of the compartments or the passageways through which the product is conveyed. The inert gas performs two functions. The first is, of course, to positively preclude the entrance of air into the furnace atmosphere. The second is to positively prevent the diffusion (of any vaporized ash, metallic elements, or gases evolved in the heating chamber either from the product or the furnace itself) out of the heating chamber and back into either passageway. All of these heat evolved materials must be conveyed out the chimneys, because it was found that when these evolved materials were allowed to contaminate the atmosphere of the cloth passageways, which are much lower in temperature than the heating chamber, they deposit upon the fibrous material being processed giving rise to undesirable properties in the product, such as comparatively high ash content, weakness, and brittleness. The preferred inert gas flow rates must, therefore, be high enough to preclude the entrance of air and to prevent the diffusion of evolved materials back into the passageways 5a and 5b.

If a purifying gas were employed (such as through inlets 47) along with the inert gas, it was found that generally the flow rates of the purifying gas into the furnace could be varied considerably with equivalent results. For best results, however, sufficient purifying gas as required for removal of ash, metals or metal complexes (such as by chemical reaction therewith) is provided.

Carbon tapes, felt, yarns, etc., can also be heat-treated or graphitized by this process in the same manner as carbon cloth or they can be heat-treated or graphitized simultaneously, with the tapes, felt, yarns, etc., riding on top of the carbon cloth.

The following examples are set forth to further describe the invention:

EXAMPLE I

A roll of carbon cloth having the properties listed in Table I was processed to a temperature of 2205 to 2240° C. in the furnace illustrated and described herein. Nitrogen gas was piped into each end compartment at flow rates of 240 and 150 standard cubic feet per hour into the exit (7a) and entrance (7) end compartments, respectively. Another small stream of nitrogen was bubbled through carbon tetrachloride prior to entering the furnace at inlets 47 so as to purify the cloth being processed. The cloth was pulled through the two-foot long heating chamber at such a rate that its duration time at the processing temperature was as little as about twelve seconds (1 foot/6 seconds or 10 feet per minute), but generally somewhat longer. The graphite cloth produced was of excellent quality as may be seen by the properties listed in Table I.[1] The tests were performed on a sufficient number of test samples obtained from the roll of cloth as to obtain representative results.

TABLE I.—PROPERTIES OF CARBON CLOTH BEFORE AND AFTER HEAT-TREATMENT

|  | Carbon Cloth | Graphite Cloth |
|---|---|---|
| Percent Carbon | 95 | 99.77 |
| Percent Ash | 1 | 0.02 |
| Percent Volatile Matter | 4 | 0.21 |
| Comparative Resistance to Oxidation (Percent Weight Loss, 850° F., Still Air) | 50 | 0.43 |
| Resistivity, ohms/sq. in.: |  |  |
| Warp | 0.95 | 0.37 |
| Fill | 1.40 | 0.53 |
| Breaking Strength, lb./in.: |  |  |
| Warp | 35 | 48 |
| Fill | 45 | 23 |
| Thread Count: |  |  |
| Warp | 35 | 38 |
| Fill | 25 | 28 |
| Flexibility | Excellent | Excellent |
| Visual Appearance | (1) | (1) |

[1] Black with a high sheen.

Table II sets forth power input data for the run described in Example I. It should be noted that the cloth was not processed through the furnace until the furnace was substantially up to the desired temperature.

TABLE II.—CONTINUOUS GRAPHITE CLOTH FURNACE RUN NO. 1, CONCENTRIC HEATING ELEMENT

[Temperature and power input data]

| Time | Concentric Heating Element Temperatures, °C | | Cloth Travel Rate(in/min.) | KW Input |
|---|---|---|---|---|
| | Heating Element No. 1 (North) | Heating Element No. 2 (South) | | |
| 12:30 p.m. | | | | [1] 200 |
| 1:00 p.m. | | | | 250 |
| 1:25 p.m. | 1,065 | 1,065 | | 250 |
| 2:04 p.m. | 1,293 | 1,335 | | 250 |
| 2:15 p.m. | | | | 300 |
| 2:40 p.m. | 1,633 | 1,633 | | 400 |
| 3:00 p.m. | | 1,830 | | 300 |
| 3:30 p.m. | 1,964 | 1,975 | | 350 |
| 3:50 p.m. | 2,120 | 2,120 | | 287.5 |
| 3:57 p.m. | 2,130 to | | | 287.5 |
| 4:00 p.m. | 2,135 ← | | 60 | 312.5 |
| | 2,135 to | | | 312.5 |
| 4:10 p.m. | 2,151 ← | 2,149 | 72 | 312.5 |
| 4:10 p.m. | | | 105 | 312.5 |
| 4:25 p.m. | 2,205 | 2,185 | 105 | 300 |
| 4:33 p.m. | 2,190 | 2,210 | 105 | 287.5 |
| 4:54 p.m. | 2,270 | 2,270 | 105 | (2) |

[1] Power on. [2] End of run.

This example illustrates throughput rates between about 5 and about 9 feet per minute, and temperature increments or upheat rates from about 5250° C. to about 10,100° C. per minute. This is calculated by assuming that substantially all of the temperature increase of the cloth from room temperature to the final temperature takes place in about two feet of travel, part of which increase is within the entry passageway but most of which is in the heating chamber. Therefore at 60 inches/minute or 5 feet/minute, the cloth goes from room temperature

---

[1] Properties determined as previously indicated or as follows:
Oxidation resistance—A dried, tared sample of cloth was exposed to still air at 850° F. for four hours. The percentage weight loss incurred is then termed the percent oxidation weight loss.
Thread count—The number of threads contained in a one inch wide sample were physically counted.
Flexibility and visual appearance—Both of these are subjective tests based on personal observation and opinion.

(~25° C.) to ~2135° C. in about ⅖ of a minute or ~5250° C./minute. At 105 inches/minute or about 9 feet/minute, the cloth goes from room temperature to ~2,270° C. in about ⅖ or 0.222 minute, or ~10,100° C. per minute. At slow cloth rates of 0.5 feet/minute to a relatively low final temperature, e.g., 2100° C., it takes four minutes to go the two feet and therefore the heating rate is about $$\frac{2075}{4}$$

or about 517° C./minute. At cloth speeds approaching 20 feet per minute it takes only about 1/10 of a minute for the cloth to get up to its final temperature. With these factors in mind it may be stated that, when graphitizing, heaing or upheat rates slower than 400° C. rise per minute are possible (e.g., using slow cloth speeds and low graphitizing temperature) but will seldom be employed and that upheat rates exceeding about 26,000° C. rise per minute are also possible when graphitizing (e.g., at rapid speeds to a high temperature such as 2900° C.), but will also seldom be employed.

The foregoing approach used to calculate heating rates assumes that the heating occurs substantially entirely in the hot zone and may be considered reasonably accurate. Another more conservative approach is to assume that the heating occurs over the distance from the entrance to the slot in passageway 5a to the far end of the hot zone. This gives upheat rates which are too low because very little of the heating, relatively speaking, takes place in passageway 5a, particularly the portions thereof remote from the hot zone. A third method would be to assume that most of the heating occurs between entrance into the hot zone and the first heating element. This method is partly justified by actual sight tube readings taken on the cloth while over each heating element which show that the cloth reaches maximum temperature by the time it reaches the first element. Higher rates than those previously indicated would result from this calculation.

In view of the foregoing discussion it is believed that the heating rate results obtained as indicated are reasonable, and fully explained by the stated assumptions which were made. It should further be pointed out that the indicated cloth travel rates and upheat rates are considered important because they are believed to be entirely different from and unanticipated by the processes of any known published references on the graphitizing of flexible carbonaceous materials.

EXAMPLE 2

The chemical and physical properties of graphite cloth from another run are tabulated in Table III. This run was very similar to Run No. 1 (identical starting materials were employed) except that only a purging gas ($N_2$) was used. No purifying gases (such as $Cl_2$ or $CCl_4$ fumes) were used. A comparison of the chemical properties of the graphite cloth from these runs shows that they are almost identical with the exception of one property (percent oxidation weight loss). In Run No. 2 the percent weight loss in 850° F. still air was 4.99% while in Run No. 1 it was only 0.43%. This indicates very strongly that the use of a purifying gas is desirable if resistance to oxidation of the product is important in its end use environment.

TABLE III.—PROPERTIES OF CLOTH AFTER HEAT-TREATMENT IN RUN NO 2

| | Graphite cloth |
|---|---|
| Percent carbon | 99.73. |
| Percent ash | 0.04. |
| Percent volatile matter | 0.23. |
| Percent oxidation weight loss, 850° F., still air | 4.99. |
| Resistivity, ohms/sq. in.: | |
| Fill | 0.34. |
| Warp | 0.58. |
| Flexibility | Excellent. |
| Visual appearance | Black with high sheen. |

Table IV sets forth power input data for Run No. 2 in Example 2.

TABLE IV.—CONTINUOUS GRAPHITE CLOTH FURNACE RUN NO. 2, CONCENTRIC HEATING ELEMENT DESIGN
[Temperature and power input data]

| Time | Concentric Heating Element Temperatures, °C | | Cloth Travel Rate(in/min.) | KW Input |
|---|---|---|---|---|
| | Heating Element No. 1 (North) | Heating Element No. 2 (South) | | |
| 10:15 a.m. | | | | [1] 150 |
| 10:25 a.m. | | | | 250 |
| 11:05 a.m. | 1,116 | 1,135 | | 250 |
| 11:33 a.m. | 1,300 | 1,320 | | 250 |
| 12:00 p.m. | | 1,459 | | 250 |
| 12:15 p.m. | 1,542 | 1,550 | | 250 |
| 12:40 p.m. | | 1,680 | | 300 |
| 1:00 p.m. | 1,815 | 1,822 | | 300 |
| 1:30 p.m. | | 1,980 | | 300 |
| 2:00 p.m. | | 2,110 | | 300 |
| 2:10 p.m. | | 2,150 | | 287 |
| 2:20 p.m. | | 2,190 to | 90 | 287 |
| 2:40 p.m. | | 2,217 ← | | 270 |
| 2:40 p.m. | | 2,217 to | 172 to | 270 |
| 2:56 p.m. | | 2,212 ← | 208 | [2] |

[1] Power on. [2] End of run.

This example illustrates throughput rates between about 7½ and about 17–18 feet per minute and upheat rates from about 7750° C. per minute to about 19,700° C. per minute.

Prior to the invention of the present heating assembly, a heat-treating furnace of a different design was constructed and fired, and test runs were carried out in same. There were no gas-tight, enclosed end compartments in this previous furnace but instead the $N_2$ neutralization gas was fed into the furnace through perforated pipes located in each passageway. The electrical design of the heating elements used in the other furnace was also different in many essentials from that of the heating elements used in the present furnace. The results of one of these test runs (which results are also typical for the other test runs) are set forth in Table V.

TABLE V.—PROPERTIES OF CLOTH AFTER HEAT-TREATMENT IN FURNACE OF PRELIMINARY DESIGN

| | Graphite cloth (Average properties) |
|---|---|
| Percent carbon | 99.36. |
| Percent ash | 0.44. |
| Percent volatile matter | 0.20. |
| Percent oxidation weight loss, 850° F., still air | 27.5. |
| Visual appearance | Greyish black with dull sheen. |

It can be readily seen that improved cloth chemical properties, especially with regard to carbon content, ash and oxidation weight loss, were achieved when the furnace in this invention was used. It should also be stated that the initial furnace design, which is other than that described and claimed herein, also led to several processing and structural difficulties which were overcome and eliminated by the furnace design of the present invention.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:
1. A heating assembly including a furnace for heating materials to substantially elevated temperatures while said materials are continuously transferred from a compartment near the inlet of said furnace to a compartment near the outlet of said furnace, said heating assembly comprising:
- (A) closed compartments at the inlet and outlet of the furnace for containing the material to be heated and the material after it has been heated, said compartments being closed to the atmosphere and substantially gas-tight;
- (B) means for continuously transferring the material to be heated and for continuously taking up the heated material while permitting the material being processed to be maintained in a substantially oxygen-free gas environment;
- (C) a furnace between said substantially gas-tight compartments in which the material to be processed is heated to the desired temperature, said furnace comprising an entry passageway leading from the substantially gas-tight inlet compartment, an exit passageway leading to the substantially gas-tight outlet compartment, and a heating chamber interposed in between; and
- (D) means for injecting substantially oxygen-free gases under pressure into the furnace, said gases being injected in such a manner that they sweep substantial portions of the entry and exit passageways and are vented through a chimney in the heating chamber;

said entry passageway, said heating chamber, and said exit passageway all being so constructed and so arranged that the material being processed is able to be maintained in a substantially stress and strain free condition, and substantially impurity-free and oxygen-free environment while moving and while it is heated;

said heating chamber being heated by at least one externally electrically powered heating element unit, said heating element unit having a primary and a secondary header, coaxially positioned but electrically insulated from each other, on the same side of the heating chamber, and coaxially disposed, concentric current-conducting, heating members electrically coupled to said headers and to each other at their ends opposite from the headers so that current from the external power source flows from one header, through one member of the concentric heating element unit and then back to the other header via the other member of the concentric heating element unit; and said heating chamber having chimney means therein for permitting escape of the injected gases and any volatile products of decomposition which might be evolved from the material being processed.

2. A heating assembly according to claim 1 wherein said heating chamber is defined by thermally stable structural members, said structural members having thermal insulation on the outside thereof, said thermal insulation being in turn contained by the base and outer walls of the furnace.

3. A heating assembly according to claim 1 wherein said heating chamber is so constructed that the material being processed passes therethrough between the heating element unit and the chimney means.

4. A heating assembly according to claim 1 wherein said entry passageway has forced cooling means near the entrance portion thereof and said exit passageway has forced cooling means near the outlet portion thereof.

5. A heating assembly according to claim 1 wherein said heating chamber contains loose thermal packing insulation means therein, supporting the heating element unit.

6. A heating assembly according to claim 1 wherein said heating element unit spans most but not all of the width of the heating chamber.

7. A heating assembly according to claim 1 wherein said furnace is adapted to heat the materials being processed to temperatures between about 500° C. and about 2900° C.

8. A heating assembly according to claim 1 wherein said heating chamber is heated by two of the externally electrically powered, coaxially disposed, concentric heating element units, said heating element units being powered from opposite sides of the heating chamber, and each unit having a primary and secondary header on the same side of the heating chamber so that in each unit current from the external power source flows from one header, through one member of the concentric heating element unit and then back to the other header via the other member of the concentric heating element unit.

9. A heating assembly according to claim 1 wherein said heating element unit has means therein by which a substantially oxygen-free gas may be injected therein and around the members of the concentric heating element unit and into the heating chamber.

10. A heating assembly according to claim 3 wherein the heating chamber is so constructed that the material being processed passes therethrough between the heating element unit and the chimney means while unsupported by any structural member of the heating chamber.

11. A heating assembly according to claim 7 wherein said furnace is adapted to heat the material being processed to temperatures between about 1300° C. and about 2900° C. and wherein the components of the heating element unit are made of graphite.

12. A heating assembly according to claim 8 wherein said furnace is adapted to heat the materials being processed to temperatures between about 1300° C. and about 2900° C. and wherein the components of the heating element units are made of graphite.

13. A heating assembly according to claim 8 wherein each of said heating element units have means therein by which a substantially oxygen-free gas may be injected therein and around the members of the concentric heating element unit and into the heating chamber.

14. In a process for graphitizing flexible carbonaceous fibrous material by subjecting said material to graphitizing temperatures between about 2000° C. and about 2900° C. in a heating assembly which is substantially free of oxygen, the steps of:
- heating said flexible carbonized fibrous material according to a rate of from about 400° C. rise per minute to about 26,000° C. rise per minute to the final graphitizing temperature while continuously passing the carbonized flexible textile material through the heating assembly and through a graphitizing furnace within said assembly at a rate of from about 0.5 foot per minute to about 20 feet per minute; and
- continuously recovering within the heating assembly a cooled flexible graphitized fibrous product while maintaining said graphitizing furnace and said heating assembly substantially free of oxygen.

15. In a process for graphitizing flexible carbonaceous fibrous material by subjecting said material to graphitizing temperatures between about 2000° C. and about 2900° C. in a heating assembly which is substantially free of oxygen, said flexible carbonaceous fibrous material having at least 94% carbon content and no more than 1.5% ash content and 4.5% volatile matter content, the steps of:
- heating said flexible carbonized fibrous material according to a rate of from about 400° C. rise per minute to about 26,000° C. rise per minute to the final graphitizing temperature while continuously passing the carbonized flexible textile material through the heating assembly and through a graphitizing furnace within said assembly at a rate of from about 0.5 foot per minute to about 20 feet per minute; and continuously recovering within the heating assembly a cooled flexible graphitized fibrous product, said graphitized product being of at least 99.5% carbon content and no more than 0.15% ash content and 0.35% volatile matter content, and said carbon content being substantially higher and said ash and volatile matter contents being substantially lower than those of the initial carbonized flexible starting material, while maintaining said graphitizing furnace and said heating assembly substantially free of oxygen.

16. A process according to claim 14 wherein the flexible carbonaceous material being processed is swept with an inert gas at least part of the time it is continuously passing through the heating assembly.

17. A process according to claim 14 wherein the flexible carbonaceous material is swept with an inert gas and with a purifying gas at least part of the time it is continuously passing through the heating assembly.

18. A process according to claim 15 wherein the flexible carbonaceous material being processed is swept with an inert gas at least part of the time it is continuously passing through the heating assembly.

19. A process according to claim 15 wherein the flexible carbonaceous material is swept with an inert gas and with a purifying gas at least part of the time it is continuously passing through the heating assembly.

20. In a process for heat-treating flexible fibrous material by subjecting said material to temperatures between about 500° C. and about 2900° C. in a heating assembly which is substantially free of oxygen, the steps of:

heating said flexible fibrous material to its final temperature while continuously passing it through the heating assembly and through a furnace within said assembly at a rate of about 0.5 foot per minute to about 20 feet per minute, and continuously recovering within the heating assembly a cooled flexible fibrous product while maintaining said furnace and said heating assembly substantially free of oxygen.

21. A process according to claim 20 wherein the flexible fibrous material to be heat-treated is pre-carbonized and wherein said pre-carbonized fibrous material is heat-treated within the furnace to a temperature between about 1300° C. and about 2900° C.

22. A process according to claim 21 wherein said pre-carbonized flexible fibrous material is of cellulosic origin.

References Cited
UNITED STATES PATENTS

| | | | |
|---|---|---|---|
| 2,621,218 | 12/1952 | Juckniess | 13—20 XR |
| 2,644,020 | 6/1953 | Hamister | 13—20 XR |
| 3,072,392 | 1/1963 | Palmer | 263—3 |
| 3,179,735 | 4/1965 | Robinson | 13—20 |

FREDERICK L. MATTESON, JR, *Primary Examiner.*

A. D. HERRMANN, *Assistant Examiner.*